(12) United States Patent
Mutou et al.

(10) Patent No.: US 7,131,513 B2
(45) Date of Patent: Nov. 7, 2006

(54) OCCUPANT DISCRIMINATING METHOD FOR VEHICULAR SEAT

(75) Inventors: Tuyoshi Mutou, Yokohama (JP); Takashi Takeshita, Yokohama (JP); Toshihiko Yamaguchi, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 472 days.

(21) Appl. No.: 10/761,485

(22) Filed: Jan. 20, 2004

(65) Prior Publication Data

US 2004/0159486 A1   Aug. 19, 2004

(30) Foreign Application Priority Data

Jan. 23, 2003   (JP) ............... 2003-014475

(51) Int. Cl.
B60K 28/00   (2006.01)
(52) U.S. Cl. ............ 180/273; 280/735; 701/45
(58) Field of Classification Search ............ 280/734, 280/735; 180/273; 701/45
See application file for complete search history.

(56) References Cited

U.S. PATENT DOCUMENTS

| | | | |
|---|---|---|---|
| 6,012,007 A | | 1/2000 | Fortune et al. |
| 6,921,108 B1 * | | 7/2005 | Kojima et al. ............ 280/735 |
| 7,009,502 B1 * | | 3/2006 | Breed et al. ............ 340/436 |
| 7,009,509 B1 * | | 3/2006 | Sakai ............ 340/457.1 |
| 7,023,355 B1 * | | 4/2006 | Sakai et al. ............ 340/667 |
| 7,026,946 B1 * | | 4/2006 | Saunders et al. ............ 340/666 |
| 2004/0051376 A1 | | 3/2004 | Lich et al. |

FOREIGN PATENT DOCUMENTS

| | | |
|---|---|---|
| DE | 197 54 166 A1 | 6/1999 |
| EP | 1 205 342 A1 | 5/2002 |
| JP | 2001-180353 A | 7/2001 |
| WO | WO 99/38731 A | 8/1999 |
| WO | WO 02/32716 A | 4/2002 |

* cited by examiner

*Primary Examiner*—Paul N. Dickson
*Assistant Examiner*—Toan C. To
(74) *Attorney, Agent, or Firm*—Frishauf, Holtz, Goodman & Chick, P.C.

(57) ABSTRACT

A flat spring of a vehicular seat is elastically supported by means of supporting springs that extend in accordance with the load of an occupant. The seat has displacement sensors, first-stage determination step, second-stage determination step, and third-stage determination step. The displacement sensors output electrical signals corresponding to the respective elongations of the springs. The first-stage determination step determines the occupant in the seat in accordance with voltage values delivered from the displacement sensors. The second-stage determination step determines whether or not the result of determination by the first-stage determination step is maintained for a given period of time. The third-stage determination step compares the result of determination by the second-stage determination step with the preceding result of determination and specifies the occupant in accordance with the result of the comparison.

5 Claims, 10 Drawing Sheets

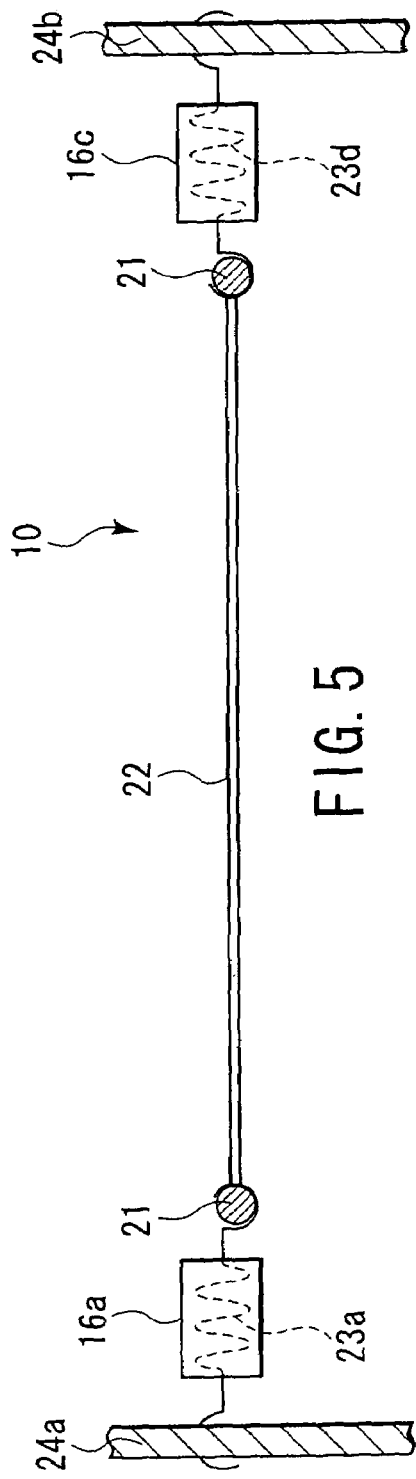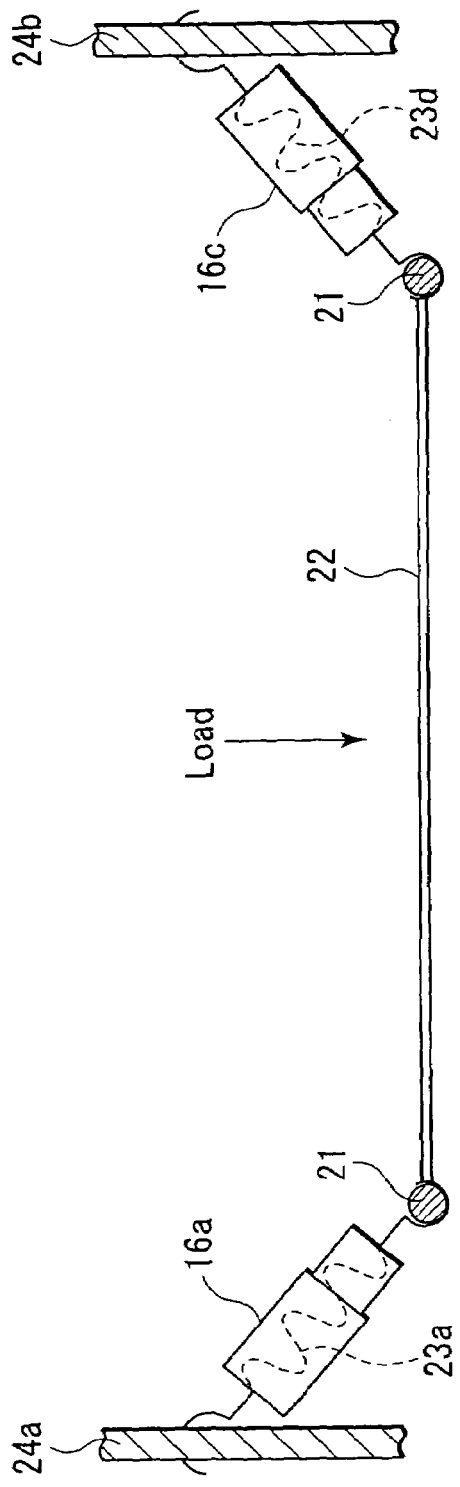

OCCUPANT DISCRIMINATING METHOD FOR VEHICULAR SEAT

CROSS-REFERENCE TO RELATED APPLICATIONS

This application is based upon and claims the benefit of priority from the prior Japanese Patent Application No. 2003-014475, filed Jan. 23, 2003, the entire contents of which are incorporated herein by reference.

BACKGROUND OF THE INVENTION

1. Field of the Invention

The present invention relates to a seat used in a vehicle, such as an automobile, and more particularly, to an occupant discriminating method therefor.

2. Description of the Related Art

According to a known method that is described in Jpn. Pat. Appln. KOKAI Publication No. 2001-180353, for example, the load of an occupant in a seat of a vehicle is detected to recognize occupancy of the seat, in order to control an airbag and seatbelt retracting properly.

Further, an occupant discrimination control method is proposed to discriminate the state of occupancy of a seat that has a load receiving member, which is attached to the frame of a seat cushion by means of springs. According to this control method, loads that act at least on the front, rear, left-hand, and right-hand parts of the load receiving member are detected, and the sum total of the loads is obtained. This sum total is compared with a threshold value for occupant determination to discriminate the size of the occupant. Furthermore, the differences between the loads that act individually on the front and rear parts of the load receiving member and between the loads that act individually on the left- and right-hand parts are compared with their corresponding threshold values.

In some cases, however, a vehicle may be swung by the irregularities of a road surface, change of the course, etc., and a seated occupant may move his/her body as the vehicle runs. In the conventional occupant discrimination control method, as described above, the occupant is determined in accordance with only the detected values of the loads that act on the front, rear, left-hand, and right-hand parts of the seat cushion. According to this method, however, the occupant may be wrongly determined owing to vibration that acts on the vehicle and the occupant's behavior.

BRIEF SUMMARY OF THE INVENTION

Accordingly, the object of the present invention is to provide an occupant discriminating method for a vehicular seat, capable of preventing wrong occupant determination that is attributable to vibration of a vehicle, an occupant's behavior, etc., thereby ensuring steady occupant determination.

An occupant discriminating method according to the present invention is an occupant discriminating method for a vehicular seat, which comprises a seat cushion frame, a load receiving member on the seat cushion frame on which the load of an occupant acts, springs which are interposed between the load receiving member and the frame and extend in accordance with the load, and displacement sensors which output electrical signals corresponding to the respective elongations of the springs. The method comprises first-stage determination step which determines the type of an occupant in the seat in accordance with the electrical signals, and second-stage determination step which determines whether or not the result of determination by the first-stage determination step is maintained for a given period of time and settles the type of the occupant if the result of determination by the first-stage determination step is maintained for the given period of time.

According to this arrangement, the combination of the first- and second-stage determination step serves to prevent wrong occupant determination that is attributable to vibration of a vehicle, the occupant's behavior, etc., thereby ensuring steady occupant determination.

Preferably, the occupant discriminating method further comprises third-stage determination step which compares the result of determination by the second-stage determination step with the preceding result of determination and settles the result of determination by the second-stage determination step in accordance with the result of the comparison.

According to this arrangement, the third-stage determination step (for state change determination) that determines whether or not to settle the result of determination by the second-stage determination step ensures steadier occupant determination.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a sectional view of a no-load state taken along line A—A of FIG. 2;

FIG. 6 is a sectional view of a loaded state taken along line A—A of FIG. 2;

DETAILED DESCRIPTION OF THE INVENTION

Figure 1:
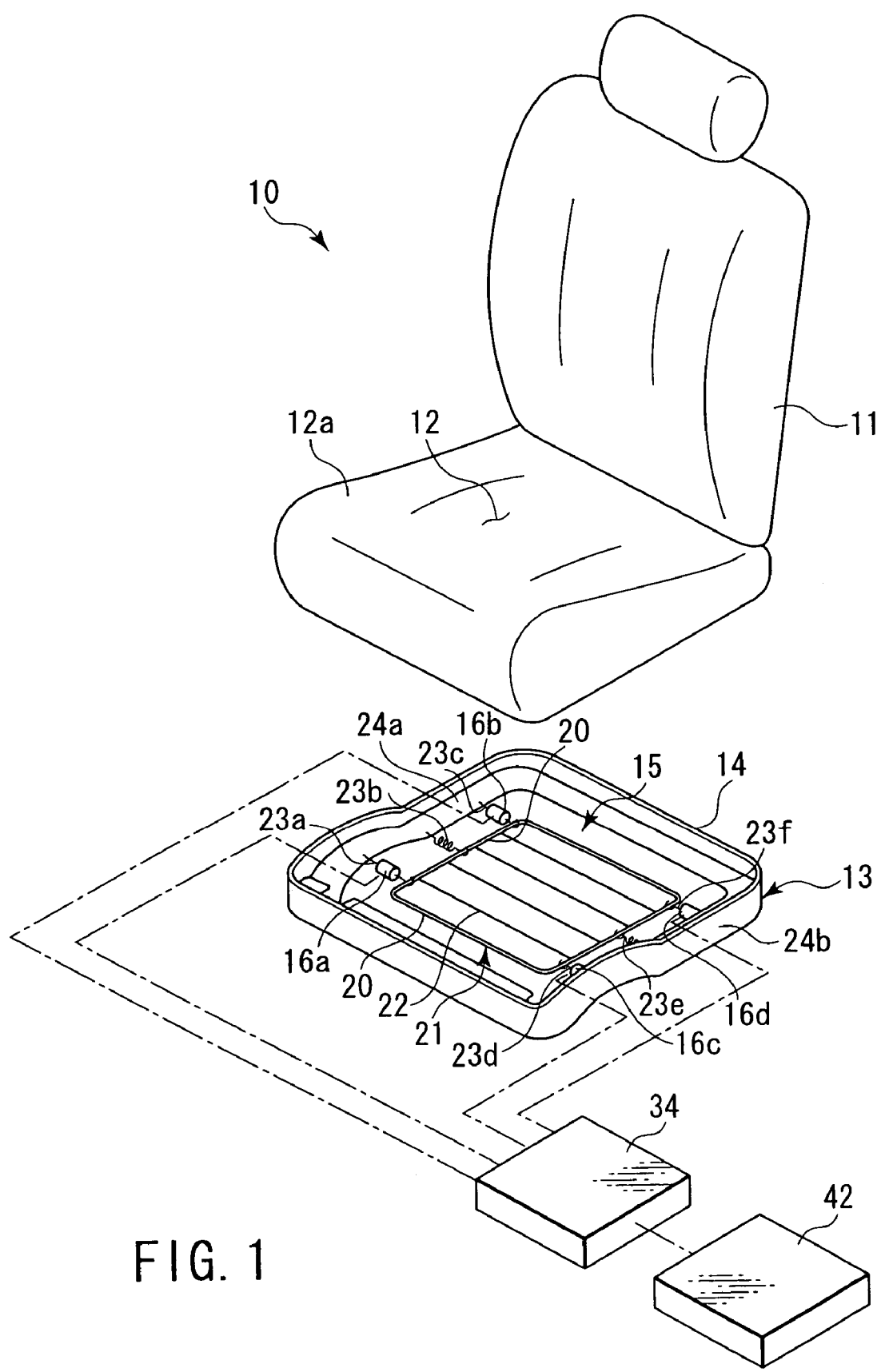
FIG. 1 is a partially exploded perspective view of a vehicular seat according to an embodiment of the invention.

An embodiment of the present invention will now be described with reference to FIGS. 1 to 13. A vehicular seat 10 shown in FIG. 1 is used as a front seat of an automobile, for example. The vehicle that is provided with the seat 10 is furnished with an airbag (not shown), for example.

As shown in FIG. 1, the vehicular seat 10 comprises a seat back 11 and a seat cushion 12. The seat cushion 12 is composed of a pad (not shown) of urethane foam, for example, a seat cushion unit 13, a cover member 12a, etc. The seat cushion unit 13 is overlain and covered by the pad. The cover member 12a covers the outer surface of the pad.

The seat cushion unit 13 is composed of a seat cushion frame 14, a flat spring 15, displacement sensors 16a to 16d, etc. The frame 14 forms the framework of the seat cushion 12. The spring 15 is an example of a load receiving member on which the loads from a seated occupant's body act. The sensors 16a to 16d serve to detect the loads. The occupant described herein is a concept that implies an adult, child, child seat, etc.

Figure 2:
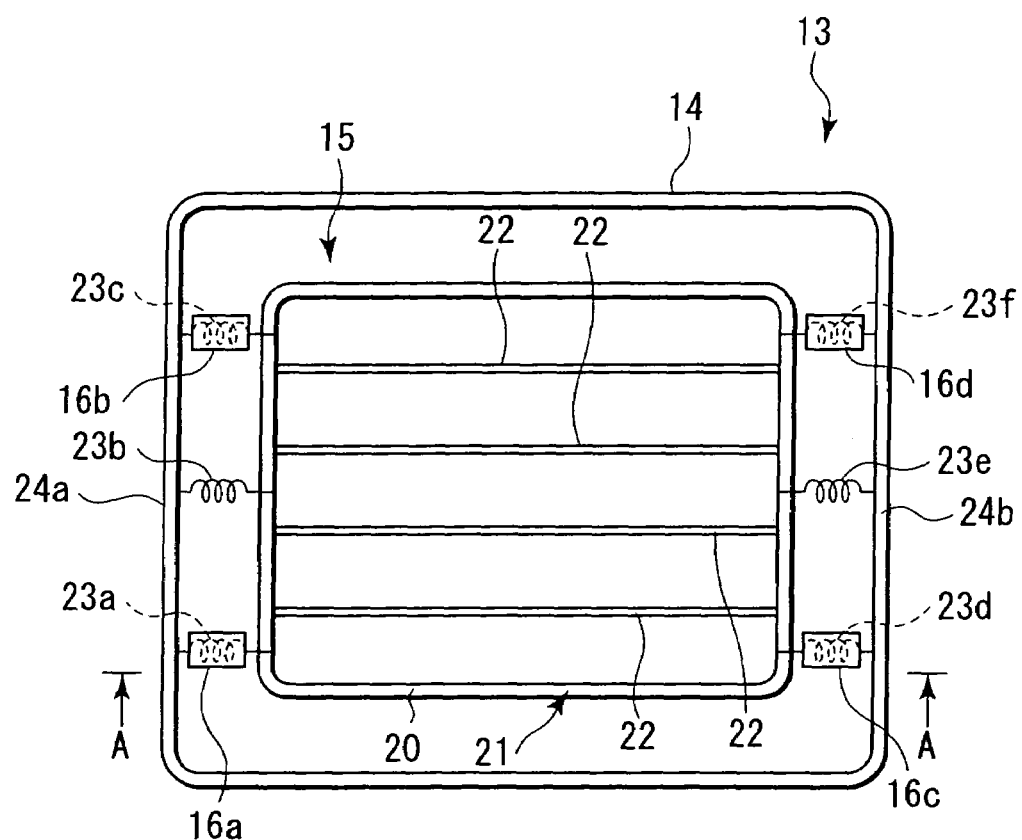
FIG. 2 is a plan view showing a flat spring, displacement sensors, and supporting springs of the vehicular seat shown in FIG. 1.
Figure 3:
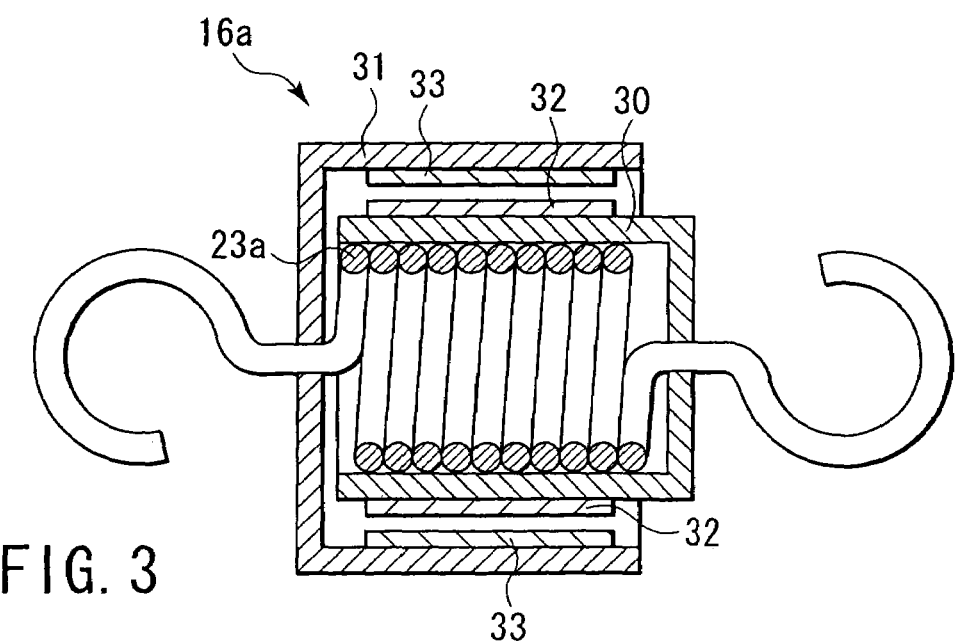
FIG. 3 is a sectional view of one of the displacement sensors.

As shown in FIG. 2, the flat spring 15 is located substantially in the center of the seat cushion frame 14. The spring 15, which serves as the load receiving member, includes a frame member 21, linear spring elements 22, etc. The frame member 21 is a substantially rectangular structure that is formed of a wire 20. The spring elements 22 are located inside the frame member 21 and stretched in the width direction of the vehicle.

The flat spring 15 is elastically supported for vertical movement on the seat cushion frame 14 by means of supporting springs 23a to 23f. The springs 23a to 23f are arranged between the seat cushion frame 14 and a plurality of circumferential spots of the flat spring 15. Each supporting spring is formed of a coil spring, for example.

The supporting springs 23a, 23c, 23d and 23f are attached to the respective front and rear parts of lateral portions 24a and 24b of the seat cushion frame 14. The displacement sensors 16a, 16b, 16c and 16d for detecting the loads on the flat spring 15 are mounted near the springs 23a, 23c, 23d and 23f, respectively. Since the displacement sensors 16a to 16d have a common construction, the displacement sensor 16a shown in FIG. 3 will now be described representatively.

The displacement sensor 16a has a small-diameter bottomed cylinder 30 that coaxially surrounds the coil portion of the supporting spring 23a and a large-diameter bottomed cylinder 31 that coaxially surrounds the cylinder 30. The small-diameter cylinder 30 can be displaced integrally with one end of the coil portion of the supporting spring 23a. The large-diameter cylinder 31 can be displaced integrally with the other end of the coil portion.

An inside electrode 32 is provided on the outer peripheral surface of the small-diameter bottomed cylinder 30. An outside electrode 33 is provided on the inner peripheral surface of the large-diameter bottomed cylinder 31. These electrodes 32 and 33 output the elongation of the supporting spring 23a as a voltage value. Thus, if the occupant loads act on the flat spring 15 to extend the spring 23a, the electrostatic capacity between the electrodes 32 and 3 changes. This change is detected as a change of the output voltage.

Figure 4:
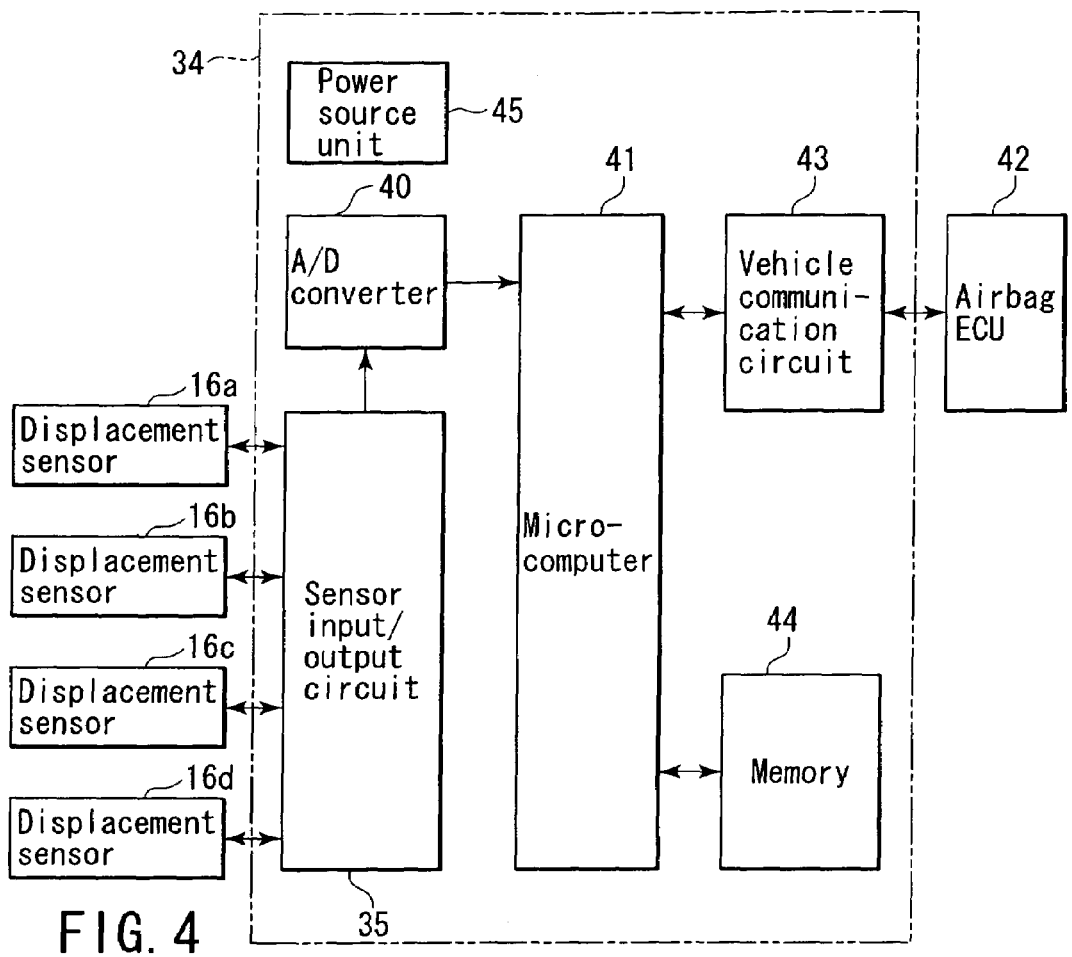
FIG. 4 is a block diagram of an ECU for occupant discrimination.

As shown in FIG. 1, an ECU 34 for occupant discrimination is provided as means for discriminating the occupant on the seat cushion 12, for example. The ECU 34 has a sensor input/output circuit 35 to which the displacement sensors 16a to 16d are connected, as shown in FIG. 4, for example. The input circuit 35 is connected to an A/D converter 40 that converts analog signals into digital signals.

Further, the automobile is furnished with a microcomputer 41 for control, a communication circuit 43, memory 44, and a power source unit 45. The communication circuit 43 transmits to and receives signals from an ECU 42 for the airbag, which will be mentioned later. The memory 44 is stored in advance with unoccupancy data on the seat cushion 12 and the like. The airbag ECU 42 unfolds the airbag in accordance with the result of determination of the occupant by means of the occupant discrimination ECU 34.

Each of the other displacement sensors 16b to 16d, like the displacement sensor 16a, is provided with a small-diameter bottomed cylinder 30 and a large-diameter bottomed cylinder 31. The displacement sensors 16a to 16d can detect loads that act individually on the front, rear, left-hand, and right-hand sides of the flat spring 15 by outputting voltages corresponding to loads that act on the supporting springs 23a, 23c, 23d and 23f, individually.

The following is a description of the operation of the vehicular seat 10 constructed in this manner.

FIG. 5 shows the seat 10 in an unoccupied state. The initial state of the supporting spring 23a at this point of time is detected by means of the displacement sensor 16a. A detection value V1, the resulting value, is stored in the memory 44 when a door of the automobile is opened at the time of delivery or driveaway.

FIG. 6 shows the seat 10 occupied by the occupant. If the occupant is seated to apply loads to the flat spring 15, the supporting spring 23a extends in the manner shown in FIG. 6, whereupon a detection value V2 is outputted. The detection values V1 and V2 are converted into digital values in the A/D converter 40. Based on these digital values and the previously obtained relation between the elongation of the supporting spring 23a and the loads, a displacement voltage value ΔVa is obtained by means of the microcomputer 41. The other displacement sensors 16b to 16d are arranged in like manner, and their respective displacement voltage values ΔVb to ΔVd are detected by means of the occupant discrimination ECU 34.

Figure 7:
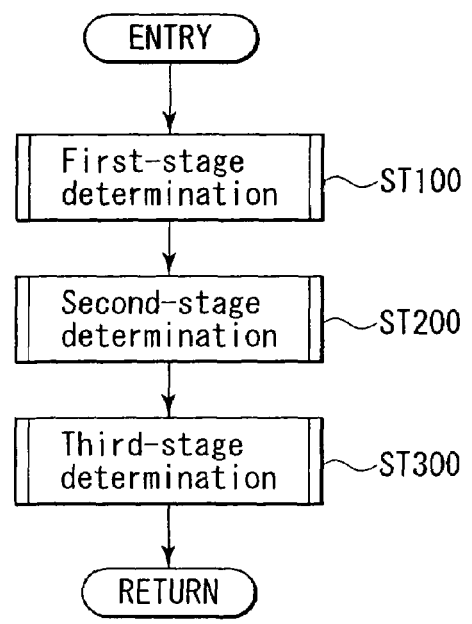
FIG. 7 is a diagram showing an outline of a control flow of the occupant discrimination.

Based on the ΔVa to ΔVd obtained in this manner, the occupant discrimination ECU 34 carries out occupant discrimination control shown in FIG. 7.

Figure 8:
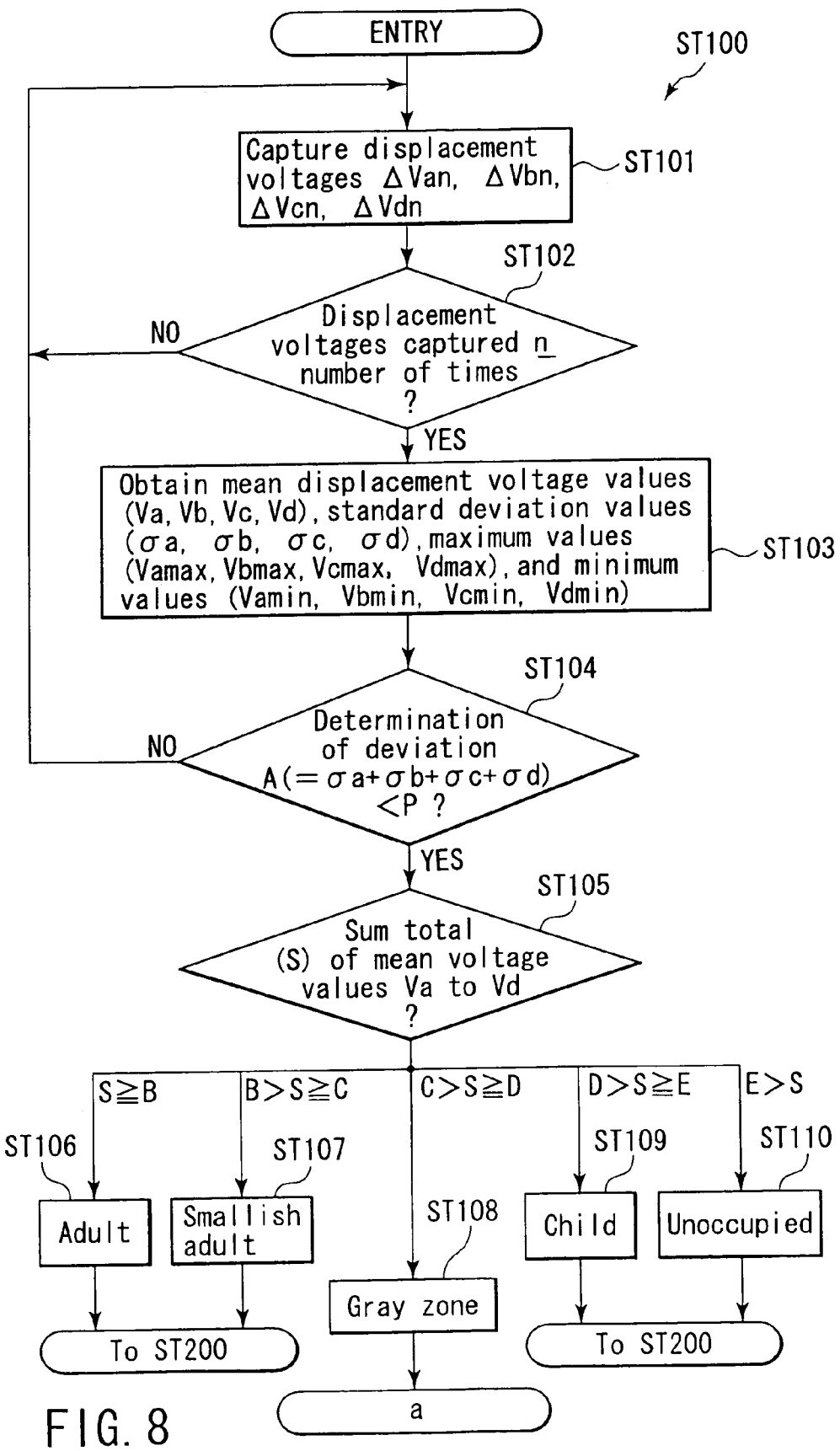
FIG. 8 is a diagram showing a part of the control flow of the occupant discrimination.

First, in Step ST100 for first-stage determination, the occupant is determined by the sum total of the loads that act on the flat spring 15. FIG. 8 shows the details of Step ST100.

In Step ST101, as shown in FIG. 8, the displacement voltage values outputted from the displacement sensors 16a to 16d are captured by the occupant discrimination ECU 34. In Step ST102, whether or not the frequency of capture of the displacement voltage values in Step ST101 is a given value (n number of times) is determined. If the n number of times is not reached, the program returns to Step ST101 after the passage of a given period of time, whereupon the displacement voltage values ΔVa to ΔVd are captured again.

If it is concluded in Step ST102 that the n number of times is reached by the frequency of capture of the displacement voltage values, the program advances to Step ST103. In Step ST103, the respective mean displacement voltage values (Va, Vb, Vc and Vd), standard deviation values (σa, σb, σc and σd), maximum values (Vamax, Vbmax, Vcmax and Vdmax), and minimum values (Vamin, Vbmin, Vcmin and Vdmin) of the displacement voltage values ΔVa to ΔVd that are captured n number of times are obtained.

The mean value Va is given by Va={(ΔVa1+ . . . +ΔVan)/n}. The values Vb to Vd are obtained by the same calculation. The maximum value Vamax and the minimum value Vamin correspond to the maximum and minimum values of the displacement voltage values ΔVa1 to ΔVan, respectively. The values Vbmax to Vdmax and Vbmin to Vdmin are obtained in like manner.

The standard deviation value σa is given by σa=√[{(ΔVa1−Va)²+ . . . +(ΔVan−Va)²}/(n−1)]. The values σb to σd are obtained in like manner.

In Step ST104, whether or not A (=σa+σb+σc+σd)<P (threshold value) is determined in order to determine variations of the values obtained in Step ST103. Steps ST101 to ST104 are repeated so that A<P is obtained.

If A<P is confirmed in Step ST104, the program advances to Step ST105. In Step ST105, the sum total (S=Va+Vb+Vc+Vd) of the mean displacement voltage values Va to Vd is obtained.

The flat spring 15 is supported by means of the supporting springs 23a to 23f. Therefore, the sum total S obtained in Step ST105 is not a voltage value that corresponds to the actual loads of the occupant. However, this sum total S can be treated as a value that is substantially proportional to the occupant loads. In the control program, the displacement voltage values ΔVa to ΔVd may be used directly as values that represent the loads. In the description to follow, however, values that are based on the voltage values ΔVa to ΔVd are given as the loads unless otherwise stated.

The sum total S is compared with threshold values B, C, D and E. These threshold values B, C, D and E serve as criteria for the discrimination of an "adult," "smallish adult," "child (or child seat)," and "unoccupied," respectively. If S≧B is given, the program advances to Step ST106, whereupon the seat is concluded to be occupied by an adult. If B>S≧C is given, the program advances to Step ST107, whereupon the seat is concluded to be occupied by a smallish adult. If D>S≧E is given, the program advances to Step ST109, whereupon the seat is concluded to be occupied a child. If E>S is given, the program advances to Step ST110, whereupon the seat is concluded to be unoccupied. After the occupant is determined in this manner, the program advances to Step ST200 (for second-stage determination) shown in FIG. 7.

If the sum total S is given by C>S≧D, the result of the determination is in a gray zone such that the seated person cannot be specified, whether a child or a smallish adult, whereupon the program advances to Step ST108. Thus, if the sum total S is not lower than the threshold value D that represents a child and is lower than the threshold value C that represents a smallish adult, the program advances to Step ST111 shown in FIG. 9 via Step ST108. In Step ST111, the difference between the loads that act individually on the front and rear parts of the flat spring 15 is detected, whereby whether the occupant is a child or a smallish adult is determined.

Figure 9:
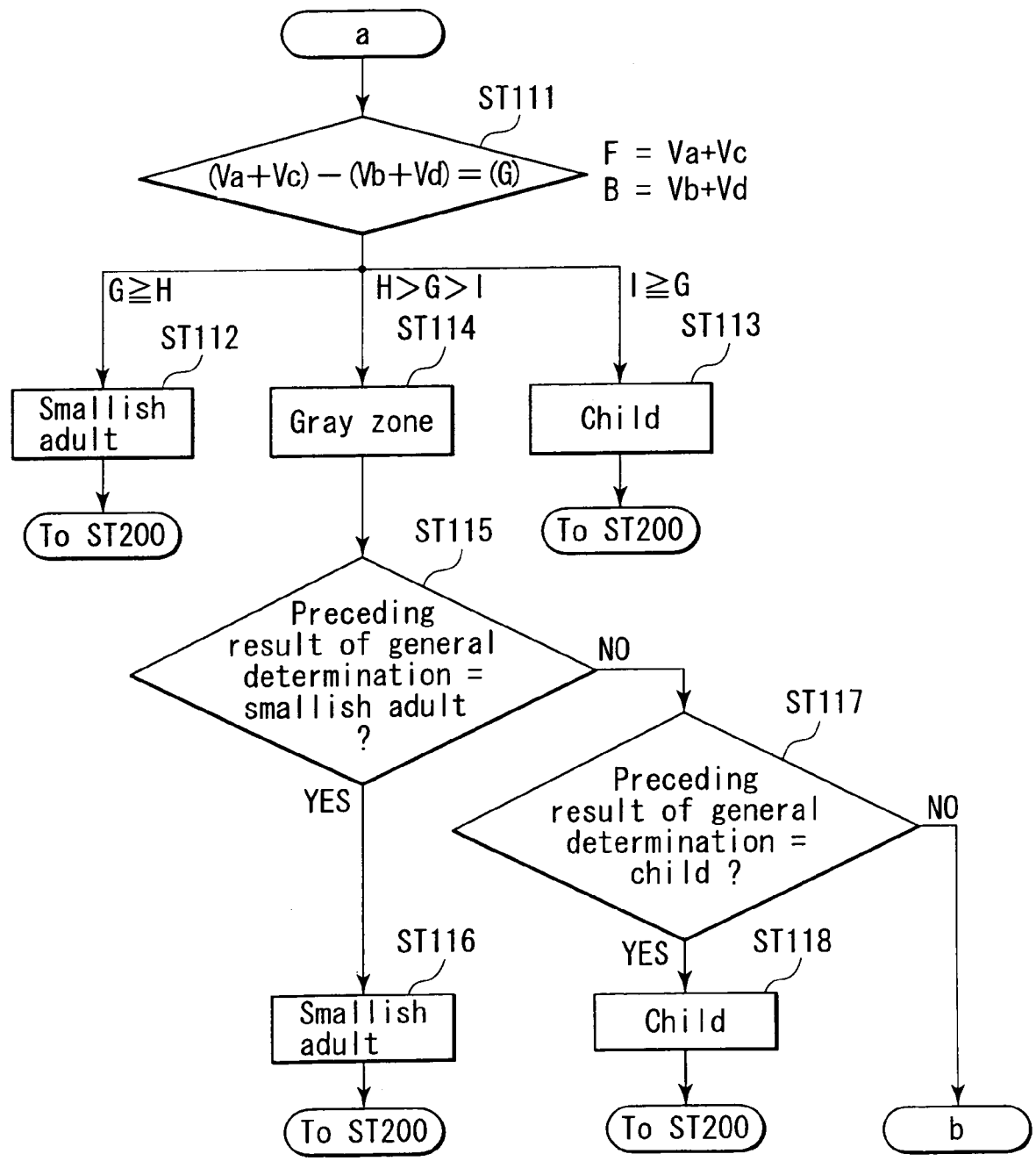
FIG. 9 is a diagram showing a part of the control flow of the occupant discrimination.
Figure 10:
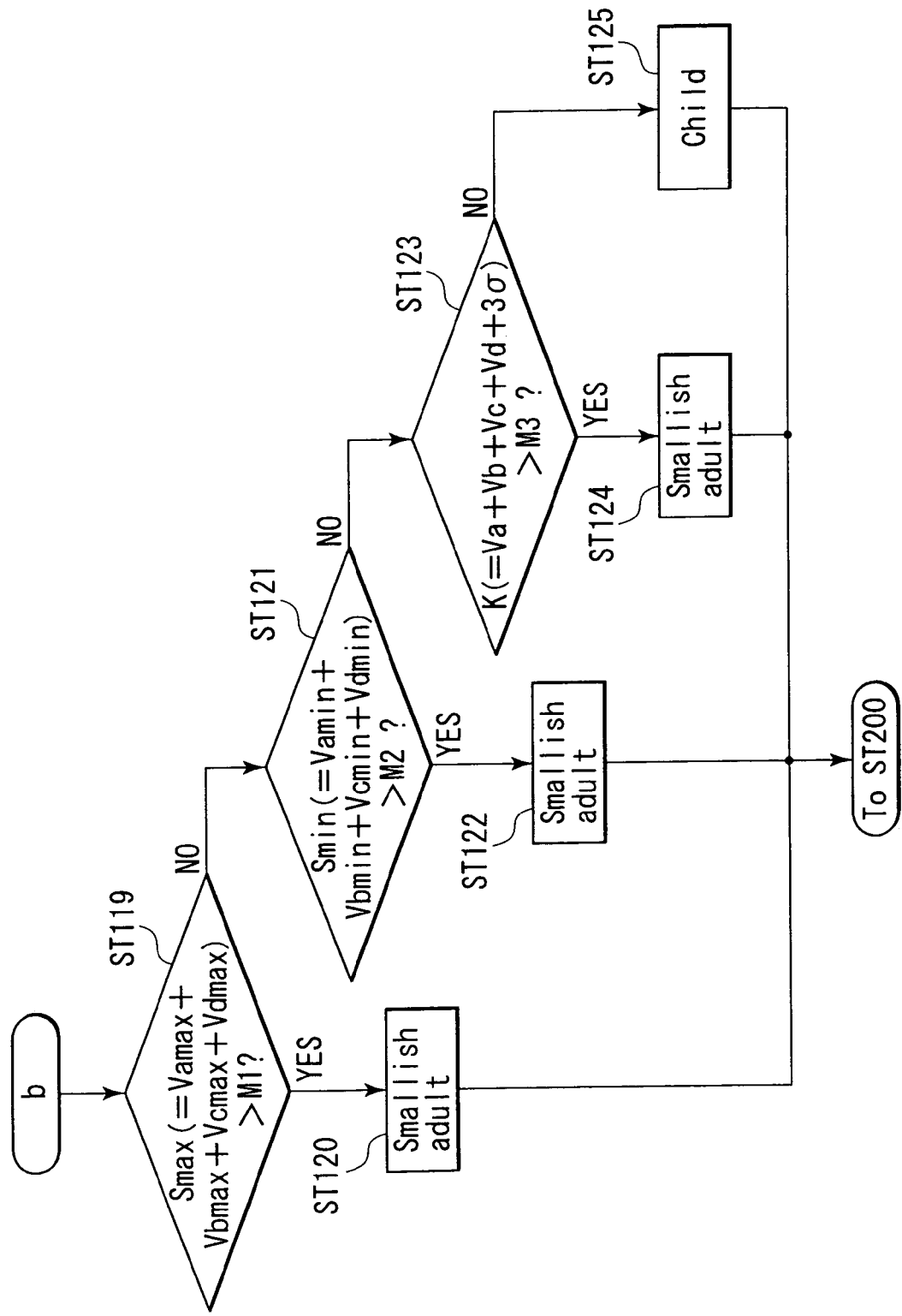
FIG. 10 is a diagram showing a part of the control flow of the occupant discrimination.

In Step ST111, as shown in FIG. 9, a value G (=F−B) that represents the difference between loads F (=Va+Vc) and B (=Vb+Vd) that act on the front and rear parts, respectively, of the flat spring 15 is detected in accordance with the mean displacement voltage values Va to Vd.

This value G is compared with first and second threshold values H and I that represent a smallish adult and a child, respectively. If a smallish adult is seated, the difference G between the loads on the front and rear parts of the flat spring 15 is liable to become greater than the threshold value H. If a child is seated, the difference G between the loads on the front and rear parts of the spring 15 tends to be smaller than the threshold value I.

If G≧H is obtained as the result of the comparison, the program advances from Step ST111 to Step ST112, whereupon the seated person is concluded to be a smallish adult. If I≧G is obtained, the program advances to Step ST113, whereupon the seated person is concluded to be a child. After the occupant is determined in Step ST112 or ST113, the program advances to Step ST200 (for second-stage determination) shown in FIG. 7.

If H>G>I is obtained as the result of the comparison in this process of Step ST111, it indicates the gray zone in which the seated person cannot be determined. In this case, abnormal sitting or the like may be supposed to have occurred, so that the program advances to Step ST115 via Step ST114. In Step ST115, whether or not the preceding result of general state identification is a smallish adult is determined. The result of general state identification described herein is the result of identification of the occupant determined and ascertained in third-stage determination (Step ST300) shown in FIG. 12.

If the preceding result of general state identification in Step ST115 shown in FIG. 9 is a smallish adult, the program advances to Step ST116, whereupon the occupant is concluded to be a smallish adult. If the result is different or if the result of general state identification is not settled because the process of Step ST300 (for third-stage determination) is not reached, the program advances to Step ST117.

In Step ST117, whether or not the preceding result of general state identification is a child is determined. If the preceding result of general state identification is a child, the program advances to Step ST118, whereupon the occupant is concluded to be a child. If the result is different or if the preceding result of general state identification is not settled, the program advances to Step ST119 of FIG. 10, whereupon the maximum values are compared and determined.

In Step ST119, the sum total Smax (=Vamax+Vbmax+Vcmax+Vdmax) of the respective maximum values (Vamax, Vbmax, Vcmax and Vdmax) of the mean displacement voltage values is obtained and compared with a third threshold value M1. If Smax>M1 is determined, the program advances to Step ST120, whereupon the occupant is concluded to be a smallish adult.

If it is concluded in Step ST119 that we have Smax≦M1, the program advances to Step ST121, whereupon the minimum values are determined. In Step ST121, the sum total Smin (=Vamin+Vbmin+Vcmin+Vdmin) of the respective minimum values (Vamin, Vbmin, Vcmin and Vdmin) of the mean displacement voltage values is obtained and compared with a fourth threshold value M2. If Smin>M2 is determined, the program advances to Step ST122, whereupon the occupant is concluded to be a smallish adult. If Smin≦M2 is determined, the program advances to Step ST123.

Standard deviation value determination is carried out in Step ST123. In this case, K (=Va+Vb+Vc+Vd+3σ) is obtained and compared with a fifth threshold value M3. If 3σ≈R(=Smax−Smin) and K>M3 are given, the program advances to Step ST124, whereupon the occupant is concluded to be a smallish adult. If K>M3 is not detected, the program advances to Step ST125, whereupon the occupant is concluded to be a child. After the occupant is determined in Steps ST120, ST122, ST124 and ST125, the program advances to Step ST200 (for second-stage determination).

Thus, after the occupant is determined in the aforesaid first-stage determination (Step ST100), as shown in FIG. 7, the program advances to the second-stage determination (Step ST200), whereupon the maintenance of the state is determined.

Figure 11:
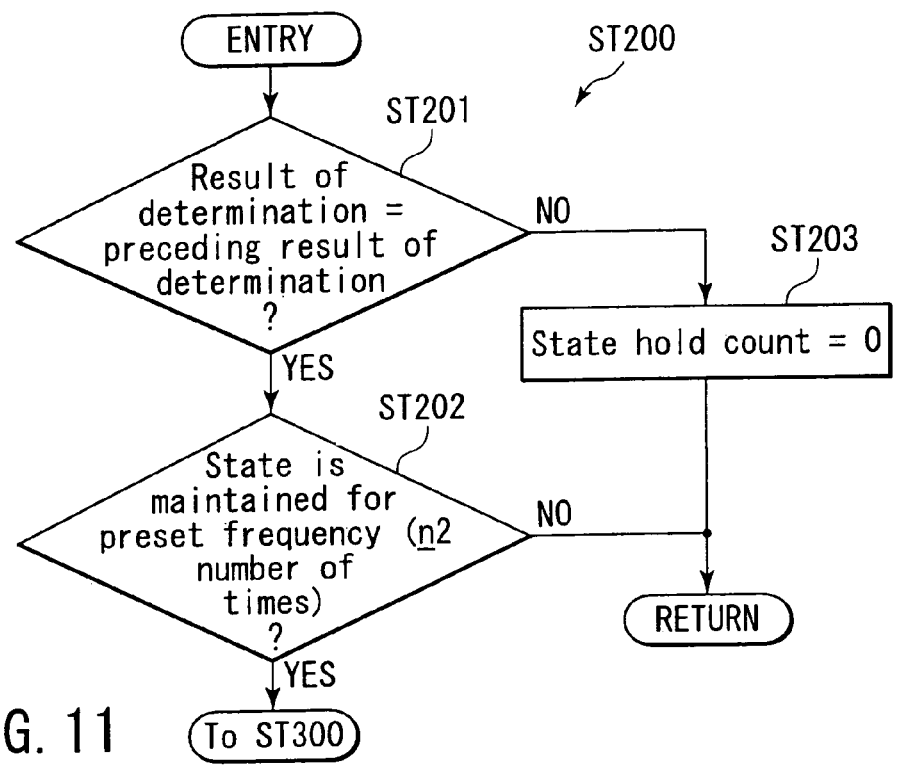
FIG. 11 is a diagram showing a part of the control flow of the occupant discrimination.

In the second-stage determination (Step ST200), as shown in FIG. 11, the result of the first-stage determination (Step ST100) that is repeated with every given time is compared with the preceding result of the first-stage determination. Thus, whether or not the preceding result of determination is maintained in the last cycle is determined in Step ST201.

In the second-stage determination (Step ST200), as shown in detail in FIG. 11, the result of the first-stage determination (Step ST100) that is obtained with every given time is compared with the preceding result of the first-stage determination in Step ST201. The result of determination used in the second-stage determination (Step ST200) represents the result of the first-stage determination (Step ST100).

If the preceding result of determination is concluded to be maintained in Step ST201, the program advances to Step ST202, whereupon whether or not the frequency of maintenance is kept at a given value (n2 number of times) is determined. If the preceding result of determination is not maintained or if there is no preceding result to be compared because a first cycle of the first-stage determination (Step ST100) is only just finished, the program advances to Step ST203.

After a state hold count for the result of determination is set to 0 in Step ST203, the program returns to the first-stage determination (Step ST100), whereupon the process of Step ST100 is repeated.

If the result of determination is concluded to have been maintained for the given frequency (n2 number of times) in Step ST202, the program advances to Step ST300 (for third-stage determination), as shown in FIG. 7. If the result of determination is not concluded to have been maintained for the given frequency (n2 number of times) in Step ST202, the program returns to the first-stage determination (Step ST100), whereupon the first-stage determination (Step ST100) is repeated.

Figure 12:
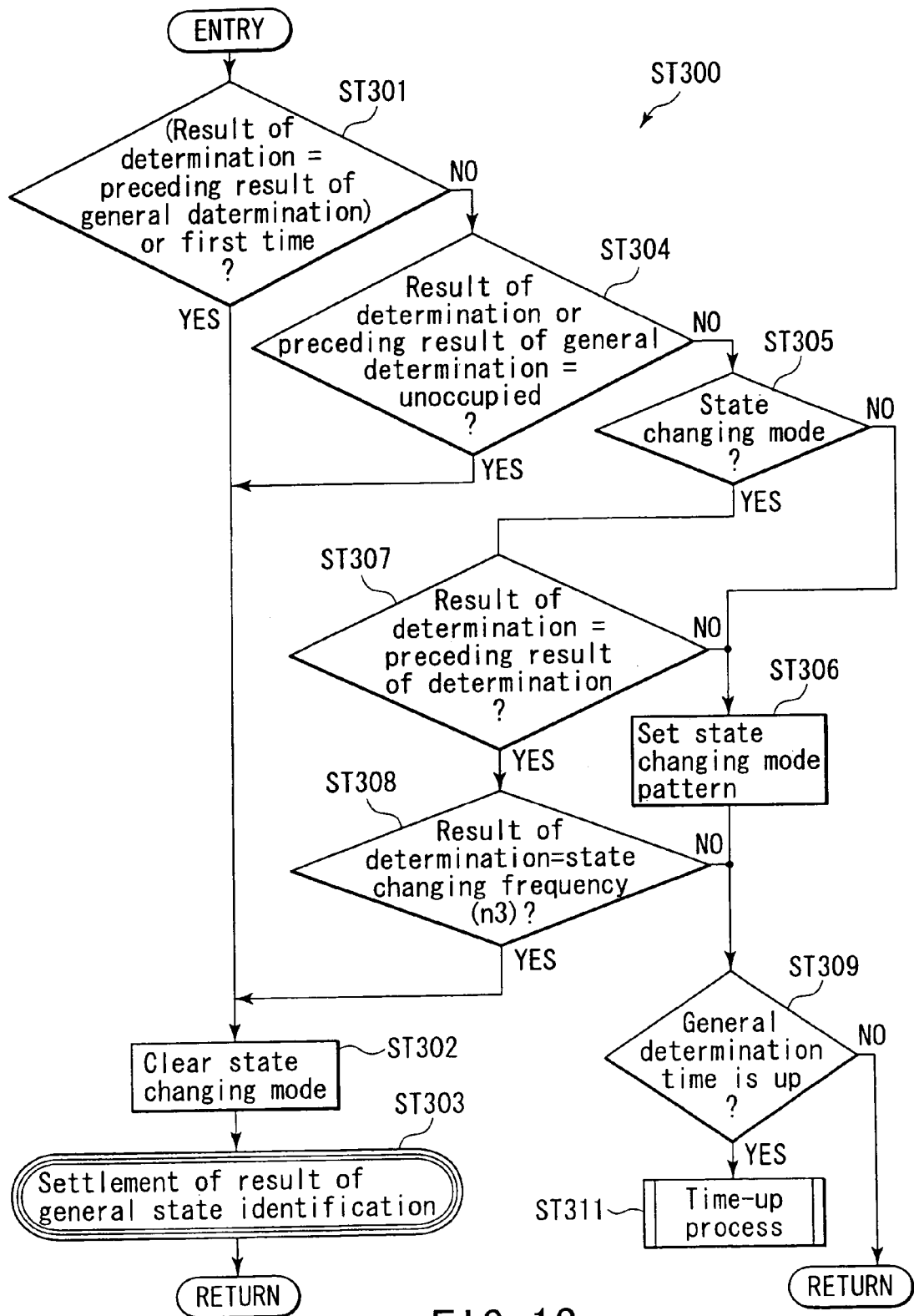
FIG. 12 is a diagram showing a part of the control flow of the occupant discrimination.

In the third-stage determination (Step ST300), as shown in FIG. 12, the result of the second-stage determination (Step ST200) and the preceding result of determination are compared, and the result of general state identification is settled in accordance with the result of the comparison. Based on this result of general state identification, the airbag ECU 42 controls the unfolding operation of the airbag or the like.

More specifically, the result of the second-stage determination (Step ST200) is compared with the preceding result of general state identification in Step ST301, as shown in FIG. 12. The "result of determination" used in the third-stage determination (Step ST300) represents the result of the second-stage determination (Step ST200).

If a first result of the third-stage determination (Step ST300) is delivered to Step ST301, the result of general state identification is not yet settled at that point of time. Therefore, the program advances to Step ST303, whereupon the first result of determination is settled as the result of general state identification. After the settlement, the first-stage determination (Step ST100) and the subsequent processes are repeated.

When the last result of the third-stage determination (Step ST300) is delivered to Step ST301, the last result of determination is compared with the result of general state identification settled in the preceding cycle. If it is concluded that these results are not different, the program advances to Step ST302.

If it is concluded in Step ST302 that a state changing mode is already set, the setting is cleared. Thereafter, the program advances to Step ST303, whereupon the result of general state identification is settled.

If the last result of determination and the preceding result of general state identification are concluded to be different in Step ST301, the program advances to Step ST304.

In Step ST304, the result of determination, whether the last one or the preceding result of general state identification, which represents the unoccupied state is determined. If either of the results is concluded to represent the unoccupied state, the program advances to Step ST302 and then to Step ST303, whereupon the last result is settled as the result of general state identification.

If neither the last result of determination nor the result of general state identification settled in the preceding cycle is concluded in Step ST304 to represent the unoccupied state, the program advances to Step ST305.

In Step ST305, whether or not the then processing mode is the state changing mode is determined. If the state changing mode is not detected in Step ST305, the program advances to Step ST306. In Step ST306, a pattern of the state changing mode is set in accordance with the preceding result of general state identification obtained in Step ST301 and the difference in the result of determination.

If the state changing mode is detected in Step ST305, the program advances to Step ST307, whereupon whether or not the result of determination is coincident with the preceding result of determination is determined. If the results of determination are concluded to be different, the program advances to Step ST306. In Step ST306, the pattern of the state changing mode is set in accordance with the difference between the results of determination obtained in Step ST307.

"Setting the pattern of the state changing mode" described herein implies setting the frequency of necessary coincidence of the results of determination for the settlement of the result of general state identification in Step ST308. This frequency of coincidence is set in accordance with the difference between the respective results of Steps ST301 and ST307. Patterns that represent the difference between the results of Steps ST301 and ST307 include a pattern that is obtained when an adult is replaced by a smallish adult, a pattern that is obtained when a smallish adult is replaced by a child, etc. A state changing frequency (n3) corresponding to each pattern is set.

If the last result of determination is concluded to be coincident with the preceding result of determination in Step ST307, the program advances to Step ST308. Whether or not the state changing frequency (n3) is maintained as the result of determination is determined in Step ST308. If the state changing frequency (n3) is concluded to be maintained, the program advances to Step ST302, whereupon the state changing mode is cleared. In Step ST303, thereafter, the result of determination concerned is settled as the result of general state identification.

If the state changing frequency (n3) is not concluded to be maintained in Step ST308, or if the state changing mode is set in Step ST306, the program advances to Step ST309. In Step ST309, whether or not a given period of time has elapsed before the settlement of the result of general state identification is determined. If it is concluded that the given period of time has not elapsed yet, the first-stage determination (Step ST100) and the subsequent processes are repeated.

Figure 13:
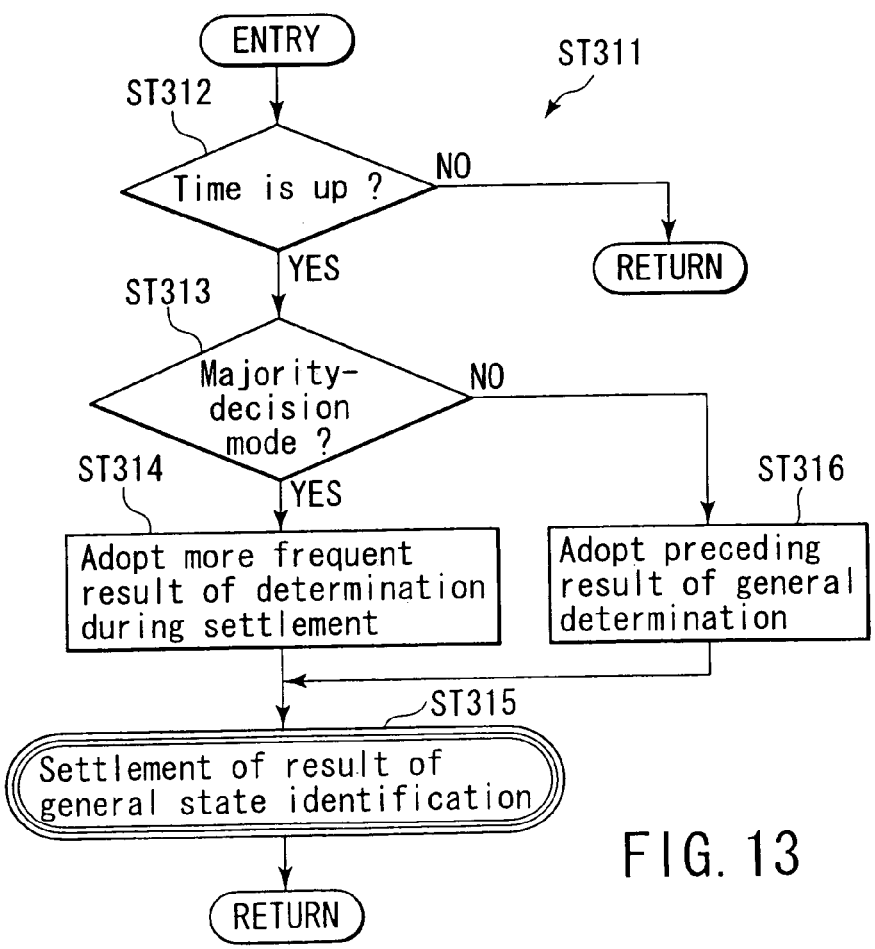
FIG. 13 is a diagram showing a part of the control flow of the occupant discrimination.

If it is concluded in Step ST309 that the given period of time has elapsed, the program advances to Step ST311, whereupon a time-up process (Step ST311) shown in detail in FIG. 13 is carried out. In the time-up process of Step ST312, whether or not the given period of time has elapsed before the settlement of the result of general state identification is determined. If it is concluded that the given processing period of time has not elapsed yet, the first-stage determination (Step ST100) and the subsequent processes are repeated.

If it is concluded in Step ST312 that the given processing time has elapsed, the program advances to Step ST313, whereupon whether or not to adopt a majority-decision mode as means for settling the result of general state identification is determined. The majority-decision mode is a mode in which the result of determination that is obtained more frequently than others in the middle of the settlement is adopted. If the majority-decision mode is adopted, the program advances to Step ST314, whereupon the result of determination that is obtained more frequently than others in the middle of the settlement is adopted. The adopted result is settled as the result of general state identification in Step ST315.

If the majority-decision mode is not adopted in Step ST313, the program advances to Step ST316, whereupon the preceding result of general state identification is adopted. The adopted result is settled as the result of general state identification in Step ST315. If the result of general state identification is settled in Step ST315, the first-stage determination (Step ST100) and the subsequent processes are repeated.

Thus, in an occupant discriminating method for the vehicular seat 10 according to the present embodiment, whether or not the result of occupant determination obtained by the first-stage determination (Step ST100) is maintained for the given period of time is determined in the second-stage determination (Step ST200). Accordingly, wrong occupant determination that is attributable to vibration of the vehicle, the occupant's behavior, etc. can be prevented, so that the occupant determination can be made steadily.

Further, whether or not the result of determination obtained by the second-stage determination (Step ST200) is coincident with the preceding result of general state identification is determined in the third-stage determination (Step ST300). If these results are not coincident, whether or not the result of the second-stage determination is maintained for the given frequency (n3), and result of general state identification for the occupant is settled in accordance with those results of determination. In consequence, the occupant determination can be made more steadily.

In the first-stage determination (Step ST100), the sum total (A) of the standard deviation values, sum total S of the mean displacement voltage values, difference G between the loads on the front and rear parts of the vehicular seat 10, sum total Smax of the maximum values, sum total Smin of the minimum values, and K are obtained. These individual values are compared with their corresponding threshold values, whereby the occupant is determined. Thus, the occupant can be determined steadily by the first-stage determination only.

In the third-stage determination (Step ST300), moreover, the state changing mode is set when the result of the second-stage determination (Step ST200) and the preceding result of general state identification are different. Thus, the result of general state identification cannot be settled unless the result of the second-stage determination (Step ST200) and the preceding result of general state identification coincide again or unless the result of the second-stage determination is maintained for the given frequency (n3).

Even after the result of general state identification is settled, the first-stage determination (Step ST100) and the subsequent processes are repeated. Therefore, an accurate result of general state identification that is required by the airbag can be obtained. For example, an accurate result of general state identification can be obtained that is required in adjusting the quantity of nitrogen or other expansive gas for the airbag according to the seated occupant (e.g., adult or child).

Figure 14:
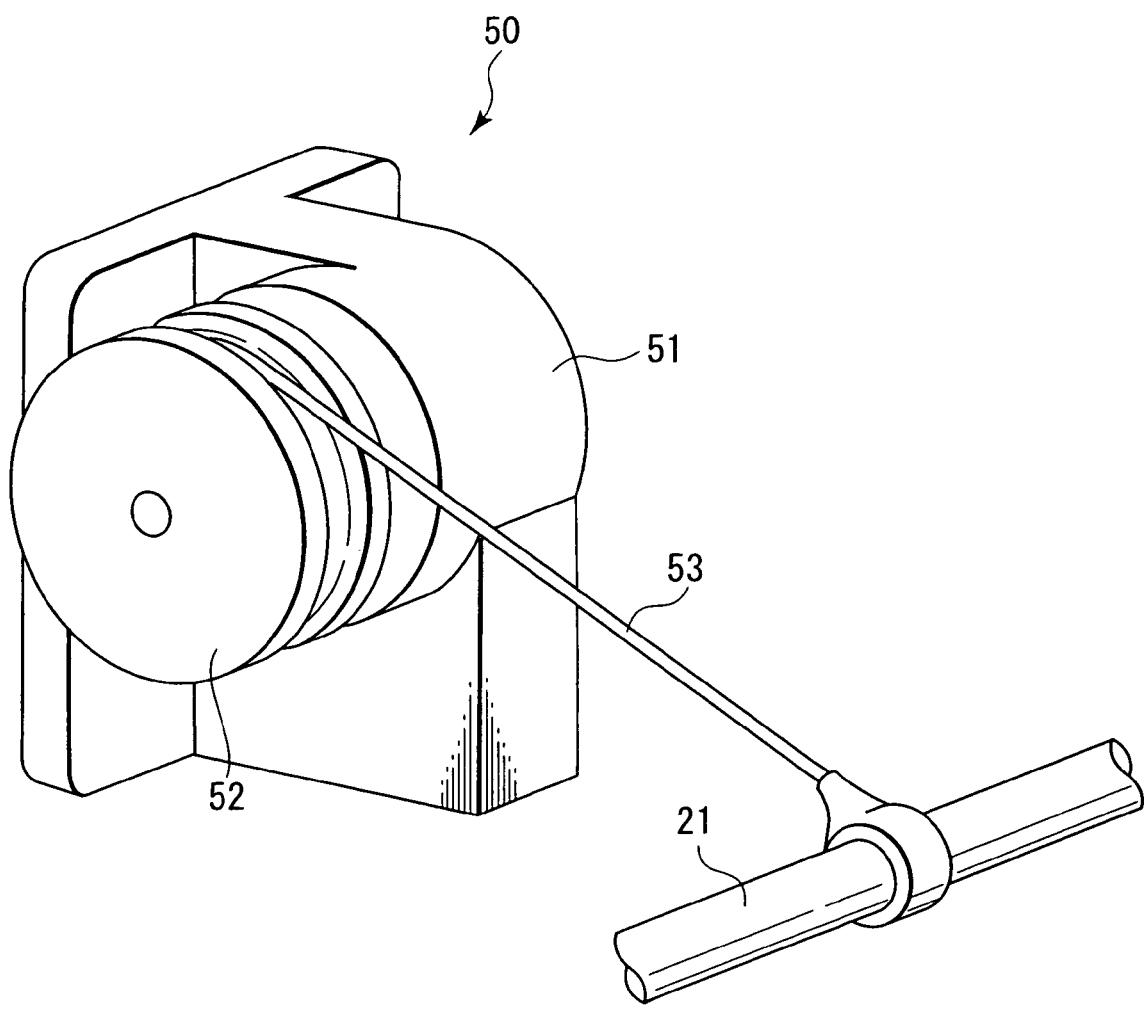
FIG. 14 is a perspective view showing another example of the displacement sensor used for the vehicular seat.

The displacement sensors 16a to 16d are designed to detect the loads in accordance with their linear displacements. As in the case of an alternative embodiment shown in FIG. 14, however, a displacement sensor 50 may be used that detects a load in accordance with a rotational displacement. The displacement sensor 50 is composed of a sensor body 51, a pulley 52 rotatable relatively to the body 51, a wire rope 53 wound on the pulley 52, etc.

The sensor body 51 has, for example, a variable resistor therein, which outputs a voltage corresponding to the rotational angle of the pulley 52. The other end of the wire rope 53 is attached to the frame member 21. Since the frame member 21 moves up and down, depending on the magnitude of the occupant loads, the length of that part of the wire rope 53 which is paid out from the pulley 52 changes. The magnitude of the loads can be detected as the pulley 52 rotates.

In order to eliminate dispersion in the production or attachment of the displacement sensors 16a to 16d, their respective output values or displacement voltage values may be corrected, for example. Although the displacement sensors used in the embodiments described above are four in number, moreover, the number is not limited to four.

In Step ST111 according to the foregoing embodiments, a smallish adult and a child are discriminated from each other by obtaining the difference G between the loads on the front and rear parts of the flat spring 15. Alternatively, however, the occupant may be determined in accordance with a ratio G1 (=B/F) between the loads on the front and rear parts of the spring 15. The threshold values H and I used in this case are expected to correspond to the respective load ratios of a smallish adult and a child.

Although the first- to third-stage determinations (Steps ST100 to ST300) are made according to the foregoing embodiments, the result of the second-stage determination (Step ST200) may be settled as the result of general state identification without performing the third-stage determination. It is to be understood, in carrying out the present invention, that the components that constitute the invention may be suitably changed or modified without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An occupant discriminating method for a vehicular seat, which comprises a seat cushion frame, a load receiving member on the seat cushion frame on which the load of an occupant acts, springs which are interposed between the load receiving member and the frame and extend in accordance with the load, and displacement sensors which output electrical signals corresponding to the respective elongations of the springs, the occupant discriminating method comprising:

first-stage determination step which determines the type of an occupant in the seat in accordance with the electrical signals; and second-stage determination step which determines whether or not the result of determination by the first-stage determination step is maintained for a given period of time and settles the type of the occupant if the result of determination by the first-stage determination step is maintained for the given period of time.

2. An occupant discriminating method according to claim 1, which further comprises third-stage determination step which compares the result of determination by the second-stage determination step with the preceding result of determination and settles the result of determination by the second-stage determination step in accordance with the result of the comparison.

3. An occupant discriminating method according to claim 1, wherein the type of the occupant to be determined is any of types including an adult, a smallish adult, and a child.

4. An occupant discriminating method according to claim 3, which comprises:

a step of obtaining the difference between loads on the front and rear parts of the load receiving member in a seat cushion and comparing the load difference with a first threshold value and a second threshold value;

a step of concluding the occupant to be a smallish adult if the load difference is not smaller than the first threshold value;

a step of concluding the occupant to be a child if the load difference is not greater than the second threshold value;

a step of identifying a gray zone in which the occupant cannot be determined if the load difference is smaller than the first threshold value and greater than the second threshold value;

steps of determining whether or not the preceding result of determination is a smallish adult if the gray zone is identified and concluding that the occupant is a smallish adult if the preceding result of determination is a smallish adult; and steps of concluding that the occupant is a child if the preceding result of determination is a child after the gray zone is identified.

5. An occupant discriminating method according to claim 4, which further comprises:

a step of determining whether or not the occupant is a smallish adult by comparing the total sum of the respective maximum values of mean displacement voltage values detected by means of the sensors with a third threshold value if the preceding result of determination is neither a smallish adult nor a child after the gray zone is identified;

a step of determining whether or not the occupant is a smallish adult by comparing the total sum of the respective minimum values of the mean displacement voltage values with a fourth threshold value; and a step of determining whether the occupant is a smallish adult or a child by comparing a value related to standard displacements of the mean displacement voltage values with a fifth threshold value.

* * * * *